(12) United States Patent
Hess et al.

(10) Patent No.: US 7,222,634 B2
(45) Date of Patent: May 29, 2007

(54) SCENT ELIMINATION SYSTEM FOR HUNTERS

(75) Inventors: Daniel G. Hess, 4328 Highborne Dr. NE., Marietta, GA (US) 30066; Brad Heath, Canton, GA (US)

(73) Assignee: Daniel G. Hess, Marietta, GA (US)

( * ) Notice: Subject to any disclaimer, the term of this patent is extended or adjusted under 35 U.S.C. 154(b) by 317 days.

(21) Appl. No.: 10/761,153

(22) Filed: Jan. 20, 2004

(65) Prior Publication Data

US 2004/0149329 A1    Aug. 5, 2004

Related U.S. Application Data

(60) Provisional application No. 60/440,884, filed on Jan. 17, 2003.

(51) Int. Cl.
*E04H 15/14*    (2006.01)
(52) U.S. Cl. .......................... 135/93; 135/901
(58) Field of Classification Search ............... 135/90, 135/91, 93, 96, 161, 901; 182/187–188, 182/135; 43/1
See application file for complete search history.

(56) References Cited

U.S. PATENT DOCUMENTS

| | | | |
|---|---|---|---|
| 2,511,497 A * | 6/1950 | Dauphinee ................. 96/152 |
| 3,766,844 A * | 10/1973 | Donnelly et al. ............ 454/238 |
| 4,524,792 A * | 6/1985 | Tzabanakis ................. 135/90 |
| 5,117,821 A * | 6/1992 | White ................... 128/206.15 |
| 5,383,236 A | 1/1995 | Sesselmann |
| 5,539,930 A | 7/1996 | Sesselmann |
| 5,613,512 A * | 3/1997 | Bean ........................ 135/90 |
| 5,617,932 A * | 4/1997 | Stuart ...................... 182/187 |
| 5,678,247 A * | 10/1997 | Vickers ........................ 2/69 |
| 5,790,987 A | 8/1998 | Sesselmann |
| 5,983,913 A * | 11/1999 | Fargason ................... 135/901 |
| 6,009,559 A | 1/2000 | Sesselmann |

(Continued)

FOREIGN PATENT DOCUMENTS

DE    3203674 A  *  8/1983

(Continued)

OTHER PUBLICATIONS

Blake, Ironman whitetails, Bowhunter, Feb. 2002, v.31, n.3, p. 44 (5 pages).*

*Primary Examiner*—David Dunn
*Assistant Examiner*—Danielle Jackson
(74) *Attorney, Agent, or Firm*—Gardner Groff Santos & Greenwald, PC (57) ABSTRACT

A hunting blind, a blind support, and a filtration unit for use on a tree with or without a tree stand. The blind support preferably includes a bracket for mounting to the tree and a foldable frame for mounting to the bracket. The blind preferably sealingly mounts to the blind support and the tree in a position around the tree stand, and preferably includes a sheet of material segmented into panels for providing access to the tree stand and a good seal around the ladder of ladder tree stands. The filtration unit preferably includes a carbon-activated filter and a fan for drawing air from a top opening of the blind, downward around a hunter in the tree stand, through the filter, and out of the blind.

32 Claims, 8 Drawing Sheets

U.S. PATENT DOCUMENTS

| | | |
|---|---|---|
| 6,233,749 B1 * | 5/2001 | Sasaki et al. .................... 4/213 |
| 6,243,979 B1 * | 6/2001 | Seats et al. .................. 182/187 |
| 6,397,869 B1 * | 6/2002 | Jennings ....................... 135/93 |
| 6,434,877 B1 * | 8/2002 | Shelton ........................... 43/1 |
| 6,588,440 B2 * | 7/2003 | Varnado .................. 135/120.1 |
| 7,040,335 B1 * | 5/2006 | Ransom ....................... 135/901 |
| 2003/0012563 A1 * | 1/2003 | Neugebauer et al. ....... 392/365 |
| 2004/0069147 A1 * | 4/2004 | Stiros et al. .................. 96/134 |
| 2004/0129143 A1 * | 7/2004 | Kvietok et al. ............... 96/134 |
| 2007/0033853 A1 * | 2/2007 | Ridge .............................. 43/1 |
| 2007/0033854 A1 * | 2/2007 | Ridge .............................. 43/1 |

FOREIGN PATENT DOCUMENTS

| | | |
|---|---|---|
| EP | 933049 A1 * | 8/1999 |
| JP | 2000-279932 A * | 10/2000 |
| WO | WO-00/33940 A1 * | 6/2000 |

* cited by examiner

SCENT ELIMINATION SYSTEM FOR HUNTERS

CROSS-REFERENCE TO RELATED APPLICATION

This application claims the priority benefit of U.S. Provisional Patent Application Ser. No. 60/440,884 filed Jan. 17, 2003, the entire scope and content of which is hereby incorporated herein by reference.

TECHNICAL FIELD

The present invention relates generally to detection-avoidance devices for hunters and, in particular, to a system for eliminating/reducing scents from humans and hunting equipment in a hunting area.

BACKGROUND OF THE INVENTION

Deer and other wild game use their senses of smell, sight, and hearing to detect and avoid their natural enemies. For most large game animals, their sense of smell is their greatest defense. Deer and other trophy animals typically travel into the wind and rely on their sense of smell to warn them of danger. Big trophy animals will avoid an area when they detect the presence of a human, or even when they detect that a human has been there. What warns them is primarily human scent from a hunter being present and residual human scent on anything touched by the hunter's hands, clothing, boots, and equipment. In addition, wild game can smell and avoid unnatural scents from weapons, tree stands, backpacks, and other hunting equipment and accessories. These human and equipment scents tend to settle and pool, and then they are spread by the wind in the hunting area generally and particularly downwind of the hunters.

To make it harder to be detected by game, hunters often attempt to make themselves harder to smell. Currently, hunters attempt to reduce human odors by wearing scent-blocking clothing (e.g., carbon suits) and/or applying masking scents (more-naturally occurring scents). Scent-blocking clothing decreases the amount of odors released from the human body, but does not eliminate odors from the hunter's breath, uncovered body parts, weapons, or hunting equipment. And masking human and other odors does not work well because most game can detect the underlying odors. In addition, unscented soaps are often used for bathing and for washing clothing. But this is a temporary solution, because the human body resumes emitting detectable levels of human scents in as little as 30 minutes afterward.

Accordingly, there is a need for a way to eliminate human and other warning scents from a hunting area so that wild game cannot as easily detect hunters. It is primarily to the provision of such a scent-elimination system that the present invention is directed.

SUMMARY OF THE INVENTION

Generally described, the present invention includes a scent-elimination system for hunters. The system includes a hunting blind in which the hunter may be concealed and a filtration unit coupled to the blind. The filtration unit draws ambient air into the blind, across the hunter to absorb human odors into the air, and through the filtration unit to absorb the human odors. Then the filtration unit directs the filtered unscented air out of the blind and into the hunting area. To aid in scent-elimination, the hunting blind is preferably made of a sent-absorbing material.

In an exemplary embodiment, the blind has an upper air inlet opening, for example, an open top, and the filtration unit opening is at a lower portion of the blind, for example, in a bottom panel. In this way, the air is drawn into the blind though the upper air inlet opening and downward towards the filtration unit lower opening.

The hunting blind may include several panels that are sectionalized and attached together so that the hunter can selectively separate the panels to get into and out of the blind, and to permit coupling the panels together around ladders of tree stands for forming a good seal.

In addition, the hunting blind may include extended side panel portions that wrap around a tree, straps that wrap around the tree in a crisscross fashion and can be tied inside the blind for convenience, and a bottom panel with an elastic edge. These features all contribute to forming a good seal between the blind and the tree to minimize leakage of odors from the blind to the hunting area.

Preferably, the system further includes a blind support for mounting to a tree. The blind support may include a tree-mounting bracket and a frame that mounts to the bracket. The frame may include an end member and two side members pivotally coupled to the end member for folding convenience. And the bracket may include two outwardly angled connector members that align with and couple to two inwardly angled connector members of the support frame.

The filtration unit includes a scent-elimination element (for example, an activated carbon material and/or an ultra-violet light) and an air mover (for example, a fan assembly). In addition, the filtration unit may include a remote on/off control switch so the hunter can turn the filtration unit on and off from the tree stand seat without moving. Furthermore, the filtration unit extends through the bottom panel opening and has a frame that is supported on the bottom panel of the blind. In this way, the filtration unit can be easily installed and removed as desired.

In another aspect of the invention, it will be understood that the support frame provides increased strength and can therefore be provided for use with conventional hunting blinds. And the blind, the blind support, and the filtration unit can be provided individually as component parts for use in the present or another scent-eliminating system.

In addition, the present invention provides a method of eliminating a hunter's scent from a hunting area. The method includes first positioning the hunter in a blind having a closed space except for an upper air inlet and a lower air filtration opening. The next method step is drawing ambient air into the blind through the upper air inlet and downwardly around the hunter to absorb human odors from the hunter into the air. Then the method continues with the step of drawing the scent-laden air into a filtration unit for scent elimination. And the method concludes with the step of directing the cleaned air through the lower air filtration opening, out of the blind, and into the hunting area. The method preferably further includes the step of mounting the blind to a tree with a good seal.

Accordingly, the present invention makes it harder for wild game to detect the scents of hunters and their equipment. In addition, the invention is portable and easy to set up for use and break down for transporting.

The specific techniques and structures employed by the invention to improve over the drawbacks of the prior devices and accomplish the advantages described herein will become apparent from the following detailed description of the exemplary embodiments of the invention and the appended drawings and claims.

DETAILED DESCRIPTION OF EXEMPLARY EMBODIMENTS

Figures 1, 2:
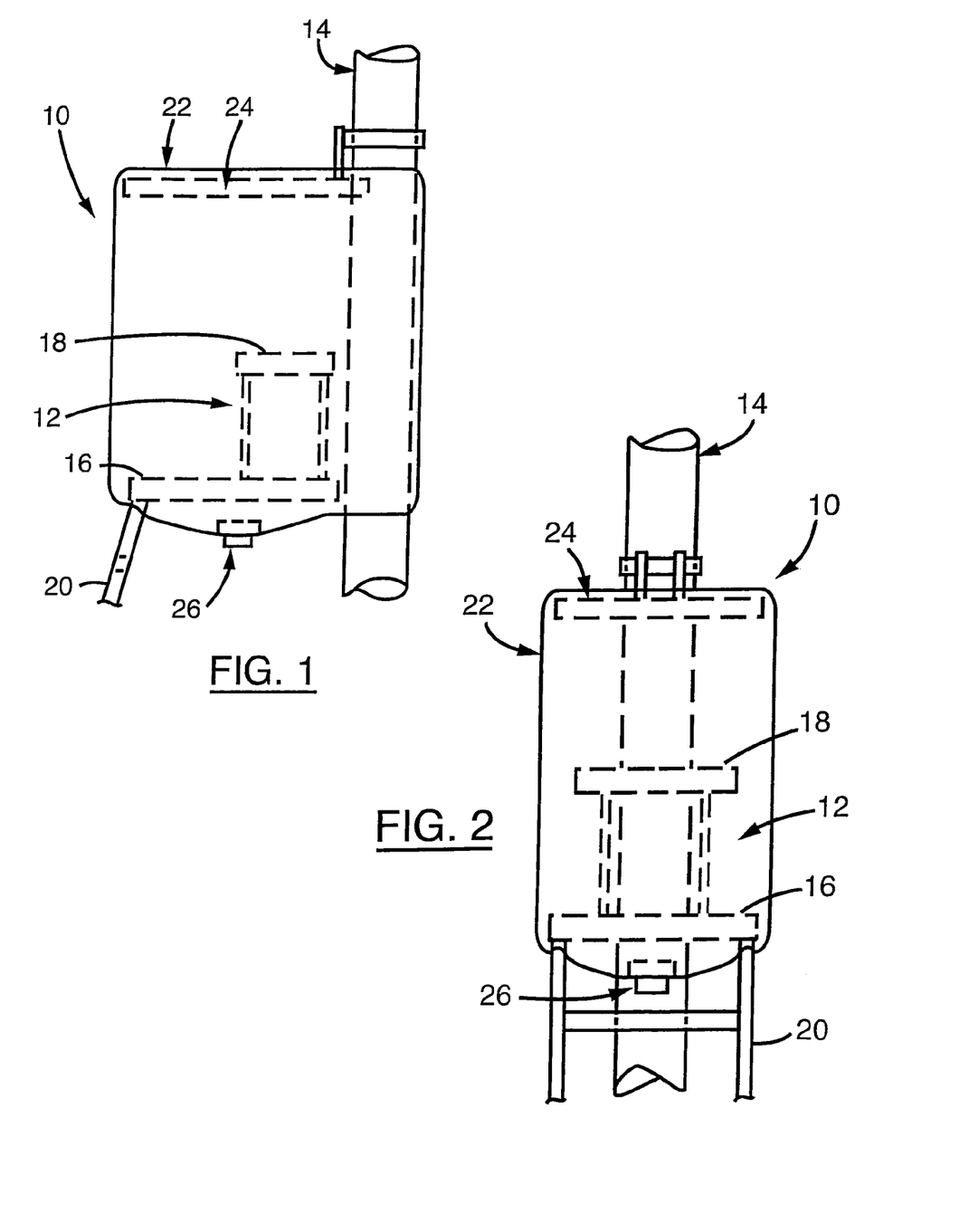
FIG. 1 is a right elevation view of a scent elimination system according to a first exemplary embodiment of the present invention, showing a blind, a blind support, and a filtration unit in use on a tree with a tree stand.
FIG. 2 is a front elevation view of the scent elimination system of FIG. 1 in use.

Referring to the drawing figures, FIGS. 1 and 2 illustrate an exemplary embodiment of the present invention, referred to generally as the scent-elimination system 10. The system 10 is designed for use by persons hunting on platforms such as tree stands, including ladder, climbing, clamp-on, and any other types of tree stands. For illustration purposes, the system 10 is described herein in conjunction with a ladder tree stand 12 mounted up in a tree 14 or other vertical structure. Ladder tree stands 12 typically include a standing platform 16, a seat 18, and a ladder 20, and the figures depict a general representation of such a tree stand. It will be understood, however, that the system 10 may be readily adapted for hunting use on the ground and for use in other applications where it is desirable to eliminate human or other odors. For example, the system 10 could be adapted for use in connection with tents, portable rest rooms, dog kennels, or other odor-sensitive areas. In addition, as used herein, "scent-elimination" generally means reducing scents to an acceptably low level given the application, even though not actually totally eliminating all scents. In particular, for hunting applications, "scent-elimination" means reducing scents to a low-enough level in the ambient air that they do not alarm wild animals and cause them to flee the hunting area.

The scent-elimination system 10 includes a hunting blind 22, a blind support 24, and a filtration unit 26. The blind support 24 mounts to the tree 14 and supports the blind 22. The blind 22 helps conceal a hunter in the tree stand 12 from visible detection by wild game. In addition, the blind 22 provides a closed space where scents from the hunter and the hunter's equipment tend to pool and settle. And the filtration unit 26 is positioned at a lower portion of the blind to draw air into the top of the blind, down around a hunter in the tree stand 12, through the filtration unit 26, and out of the blind. Details of the exemplary hunting blind 22, blind support 24, and filtration unit 26 will now be described.

Figure 3:
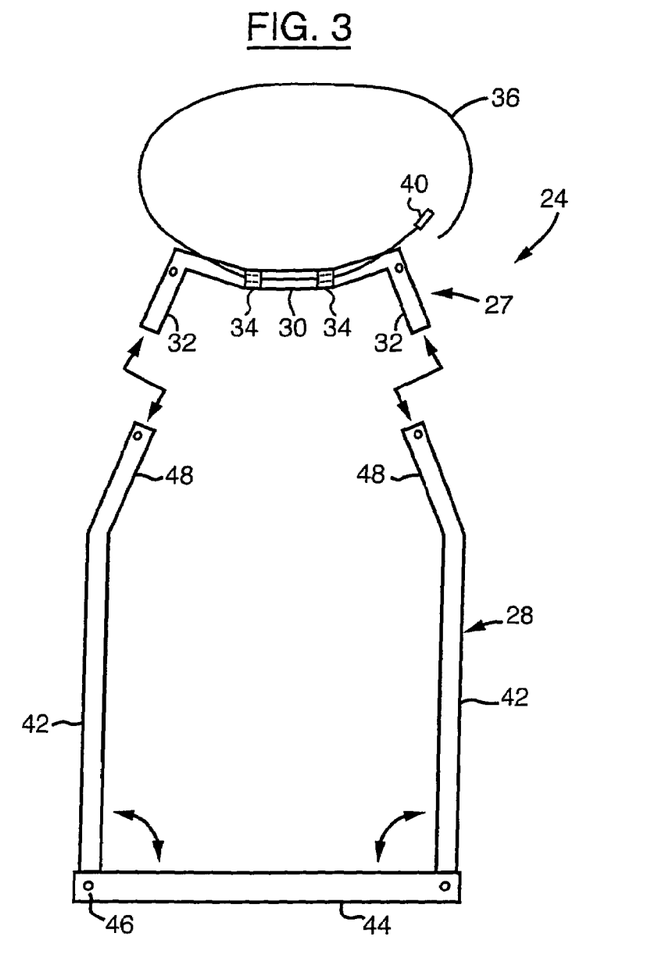
FIG. 3 is a plan view of the blind support of FIG. 1, showing a bracket and a frame disassembled.
Figure 4:
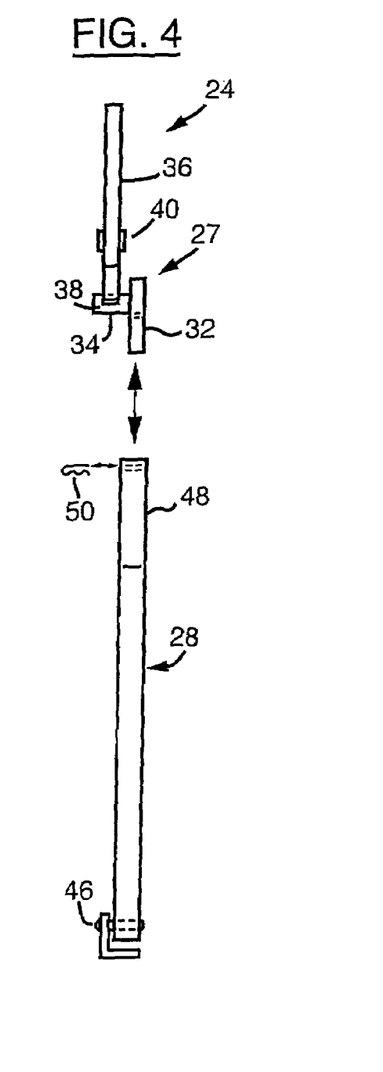
FIG. 4 is a right side view of the blind support of FIG. 3.

Referring now to FIGS. 3 and 4, the blind support 24 includes a tree-mounting bracket 27 and a frame 28 that mounts to the bracket. The bracket 27 includes a lateral member 30, two connector members 32 at opposing ends of the lateral member, two tree-mounting members 34 extending vertically from the lateral member, and a tree-circumscribing strap 36 coupled to the tree-mounting members. The lateral member 30 is preferably angled or curved to more closely conform to the curvature of a typical tree 14 suitable for using the tree stand 12 with, thereby providing increased stability. The connector members 32 are configured for mounting engagement with the frame 28, as described below. The tree-mounting members 34 are vertically oriented and spaced apart for stability. The tree-circumscribing strap 36 is preferably routed through slots 38 formed in the tree-mounting members 34, through brackets or loops attached to the tree-mounting members, or through another strap-attaching structure. And the tree-circumscribing strap 36 has a cam buckle 40 or other releasable coupling at one end of the strap that adjustably locks with the other end of the strap.

The frame 28 includes two side members 42 coupled to an end member 44. The side members 42 and the end member 44 are preferably pivotally coupled together, for example, by a pivot pin 46, a rivet, or a nut and bolt. In this way, the side members 42 can be unfolded (as indicated by the directional arrows) for use so that the frame 28 is generally U-shaped, and the side members can be folded into a compact arrangement for storage and transportation. In addition, the side members 42 include connector members 48 that are configured for mounting engagement with the connector members 32 of the bracket 28. For example, the frame connector members 48 and the bracket connector members 32 may be telescopically configured for coupling them together (as indicated by the directional arrows) in a manner that results in a strong support 24, and a lock pin 50 or other keeper may be provided for locking them in this position for safety. Preferably, the frame connector members 48 and the bracket connector members 32 are similarly angled for aligning and coupling them together. In the exemplary embodiment, for example, the bracket connector members 32 are outwardly angled and the support frame connector members 48 are inwardly angled for alignment with the outwardly angled bracket connector members.

In a typical commercial embodiment, the blind support 24 is made primarily of aluminum components for light weight and high strength. For example, the tree-mounting bracket 27 may be made of ½ inch solid aluminum rectangular tubing, with the lateral member 30 being about 17 inches long and the two connector members 32 being about 2½ inches long. The tree-circumscribing strap 36 may be provided by 1 inch nylon webbing. In addition, the frame side members 42 may be made of ¾ inch hollow aluminum rectangular tubing for telescopically receiving therein the bracket connector members 32, and the frame end member 44 made of 1 inch aluminum angle. And the frame side members 42 may be about 36 inches long and the end member 44 about 28 inches long. Preferably, the pivotal coupling of the side members 42 to the end member 44 is loose enough that the side members can be moved out of alignment with each other as they are folded inward. In this arrangement, the side members 42 do not interfere with each other and instead they fold up into a nice compact arrangement with the end member 44 that is about 3½ feet long in a typical commercial embodiment.

In this way, the tree-mounting bracket 27 and the U-shaped frame 28 cooperatively form a light-weight yet very strong peripheral support 24 for the blind 22. In fact, the just-described typical commercial embodiment can support about 1000 pounds of weight, far more than typical support frames for conventional hunting blinds. Accordingly, although the blind support 24 was designed for use with the scent-elimination system 10, it can be used in non-scent-eliminating applications simply as an increased-strength support for a conventional blind, thereby providing increased safety for the hunter.

It will be understood that the above-described blind support 24 is an exemplary embodiment and that the invention includes other embodiments as well. For example, in one alternative embodiment the blind support is provided by a one-piece non-folding member. In another alternative embodiment, the side members of the blind support frame each have two sub-members that are coupled together, for example, the frame connector members may fold onto or be telescopically arranged with the remaining portion of the side members. In yet another alternative embodiment, the frame connector members and the bracket connector members are mounted and locked together by other conventional techniques, and the side members and the end member are pivotally coupled by other conventional techniques. And in still another alternative embodiment, the tree-circumscribing strap is provided by a chain or other flexible binding member.

Figure 5:
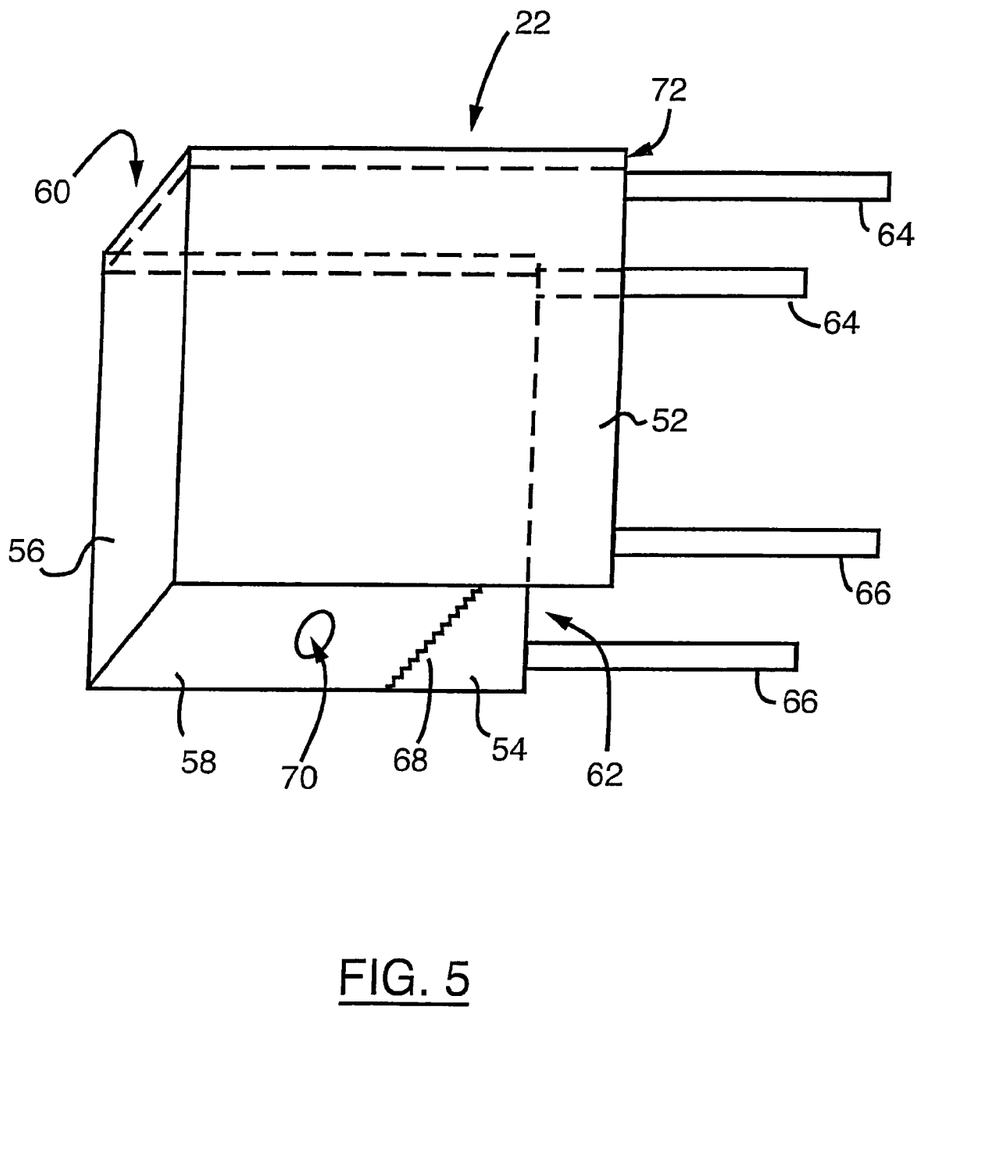
FIG. 5 is a perspective view of the blind of FIG. 1, generally showing four panels and an open top and back.

Referring now to FIG. 5, the hunting blind 22 has peripheral panels that surround the tree stand 12 and provide visual cover for hunters to conceal themselves from wild game. In addition, when the blind 22 is installed on the tree 14, the panels are mounted to the tree to cooperatively define a closed hunting space with a good seal, except for a top opening, so that all odors from the hunter and the hunter's gear settle to the bottom of the blind. As used herein, a "good seal" means a seal that eliminates or reduces the leakage of odor to an acceptable level, given the application. In particular, for hunting applications, a "good seal" means reducing scent leakage to a low-enough level in the ambient air that any scents that do escape the blind are diluted enough so as not to alarm wild animals and cause them to flee the hunting area. In addition, a "good seal" preferably reduces leakage of light and noise. To further aid in detection-avoidance, the hunting blind 12 is preferably made of a sent-absorbing material such as conventional activated carbon fabric. The number, shape, size, and construction of the panels and the resulting blind are selected for high strength, low weight, quick and easy assembly and disassembly, and use with a wide range of different types, styles, and sizes of tree stands.

Generally, the hunting blind 22 includes a right side panel 52, a left side panel 54, a front end panel 56, and a bottom panel 58. The blind 22 has an open top 60 so that the hunter has an unobstructed range of vision to monitor the hunting area for game, so that the hunter can aim his weapon without obstruction, and to provide an upper air inlet for the blind. The blind 22 has an open back end 62 for mounting to the tree 14. For mounting the blind 22 to the tree 14 with a good seal, the side panels 52 and 54 are longer than the bottom panel 58 and have two sets of tree-mounting straps 64 and 66, and the bottom panel 58 has an edge 68 made of an elastic material, as described in more detail below. The blind 22 has an opening 70 that is sized and shaped for receiving therethrough the filtration unit 26. The opening 70 is in a lower portion of the blind 22, preferably in the bottom panel 58. And an upper portion of the blind 22 mounts onto the blind support 24. For example, upper portions of the side and end panels 52, 54, and 56 may be folded and sewn, snapped, or otherwise permanently or removably attached to the body of these panels to form a passageway 72 for receiving the support frame side and end members 42 and 44 therethrough.

Figure 6:
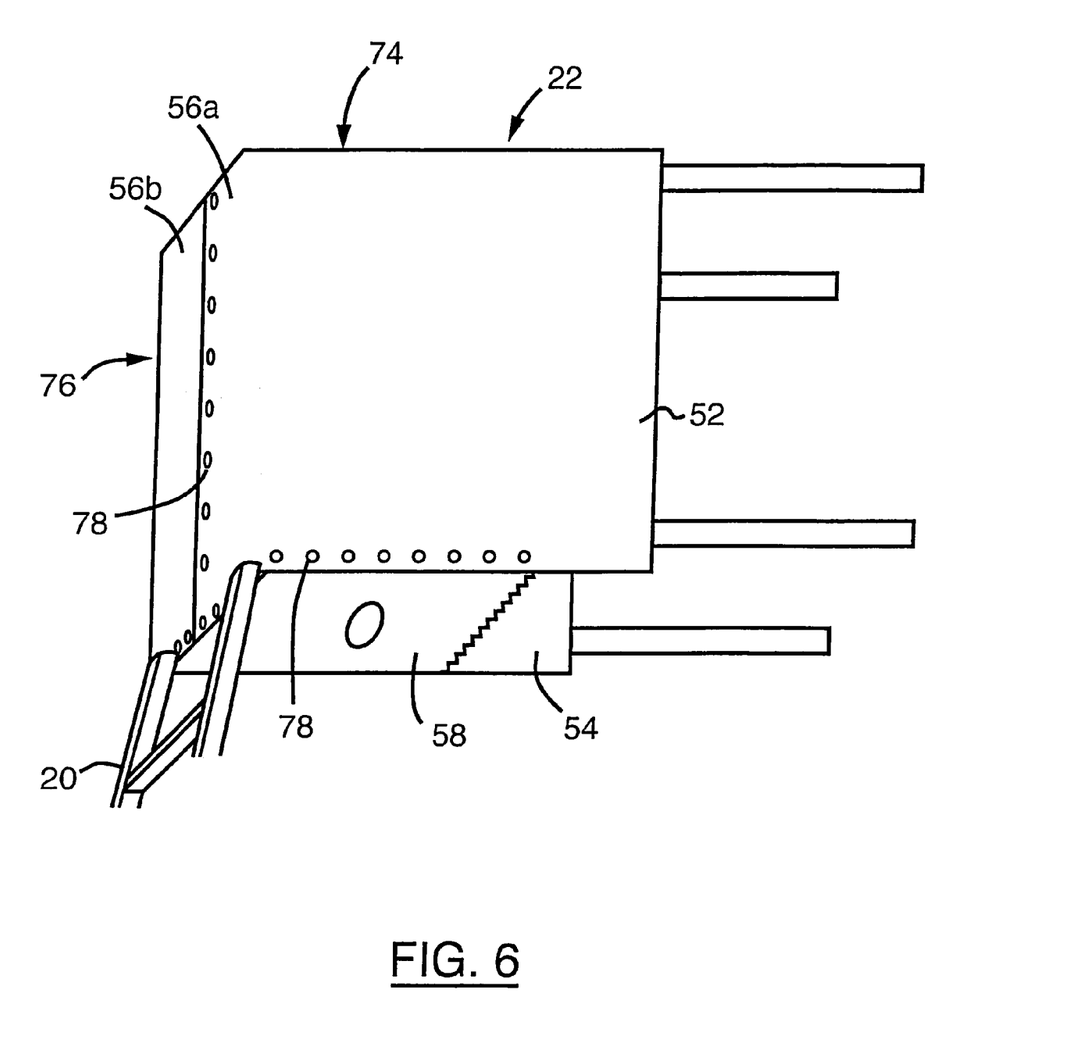
FIG. 6 is a perspective view of the blind of FIG. 5, showing in detail the segmentation of the panels.

Referring now to FIG. 6, in the exemplary embodiment of the scent-elimination system 10, the blind 22 is sectionalized for providing easy access to the tree stand 12 and a good seal around the ladder 20 of ladder tree stands. In particular, the front panel 56 is constructed of two sub-panels 56*a* and 56*b*. The right front sub-panel 56*a* and the right side panel 52 are part of a first continuous sheet of material 74, and the left front sub-panel 56*b* and the left side panel 54 are part of a second continuous sheet of material 76. The bottom edges of the first continuous sheet of material 74 and of the second continuous sheet of material 76 detachably couple to the edges of the bottom panel 58 so that they form a good seal, including a nice fit around the ladder 20. In addition, the front ends of the front sub-panels 56*a* and 56*b* detachably couple together so that they form a good seal, but can be easily separated so the hunter can get into or out of the blind 22. This allows the hunter to leave the system 10 up in the tree 14 throughout the season, instead of putting it up and taking it down for every use. Due to the unique design of the system 10, however, it can be easily installed and removed for each use if the hunter so desires. In a typical commercial embodiment, the panels 52, 54, and 56 are detachably coupled together by snaps 78 and hook-and-loop fasteners (e.g., VELCRO), though one or more other types of conventional fasteners may be suitably employed. In any case, the panels are coupled together to form a good seal.

Figure 7:
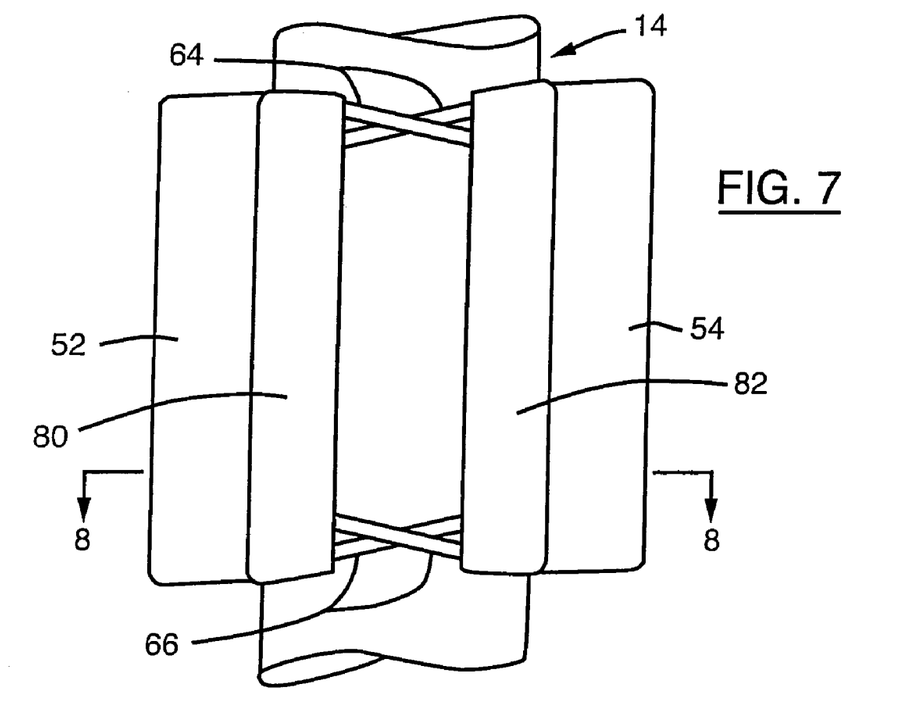
FIG. 7 is a rear elevation view of the blind of FIG. 1, showing the mounting of the blind to the tree.
Figure 8:
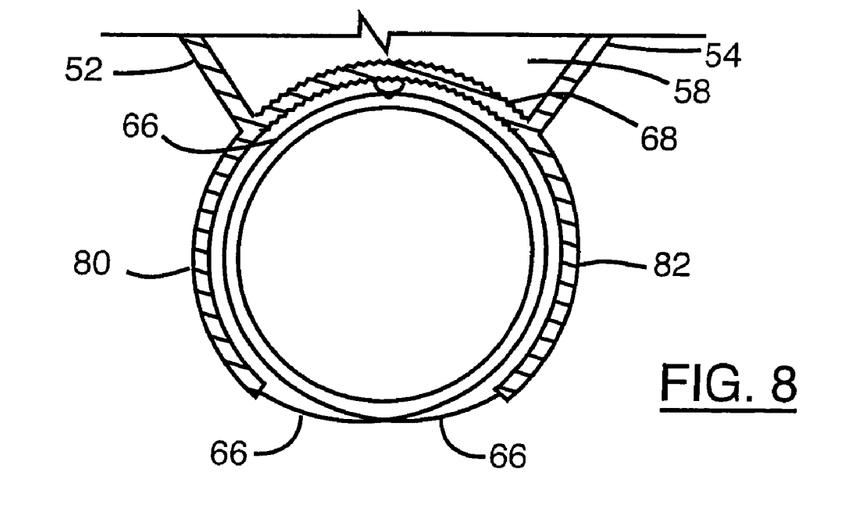
FIG. 8 is a cross section view taken at line 8—8 of the blind of FIG. 8, showing the mounting of the blind to the tree.

Referring now to FIGS. 7 and 8, the mounting of the blind 22 to the tree 14 is shown in more detail. As mentioned above, the side panels 52 and 54 have longer tree-wrapping portions 80 and 82 that extend beyond the bottom panel 58, and the bottom panel 58 has an edge 68 made of an elastic material. The hunter can wrap the tree-wrapping portions 80 and 82 at least partially around the tree 14, depending on the diameter of the particular tree. And the elastic edge 68 of the bottom panel 58 will stretch into a conforming engagement with the tree 14. In this way, a good seal is established between the panels 52, 54, and 58 and the tree 14. To secure the blind 22 in this position, the upper straps 64 are wrapped around the tree in a crossed fashion and bound together, and the lower straps 66 are wrapped around the tree in a crossed fashion and bound together. The straps 64 and 66 may be bound by tying, by buckles, or by other conventional fastening mechanisms or techniques.

It will be understood that the above-described hunting blind 22 is an exemplary embodiment and that the invention includes other embodiments as well. For example, in one alternative embodiment the blind is provided by a one-piece or two-piece sheet of material folded along seam lines, without providing for hunter in/out access or a good seal around the ladder, for use with climbing tree stands or other non-ladder platforms. In another alternative embodiment, the front panel of the blind is effectively a flap that folds up or down, or to one side or the other, or that is removable, and as such is detachably coupled along its side edges to other components of the blind. In yet another alternative embodiment, one or both of the side panels are foldable to form one or more side access openings, and the side panels include detachably couplings. In still another alternative embodiment, the blind has a top panel and upper openings for viewing, weapons, and venting positioned in the top panel or in the side or front panels near the top panel. In yet still another alternative embodiment, the blind has an opening for the filtration unit positioned in a lower portion of the side or front walls, in addition to the opening in the bottom panel, and a plug for the opening not in use, and the filtration unit includes a stand or frame-suspending assembly, so that the system can be used on the ground instead of up in a tree. In other alternative embodiments, the blind is provided by a commercially available blind that is modified for use in the system and/or the blind panels are made of a non-scent-absorbing fabric such as nylon. And in still another alternative embodiment, the blind is provided without the opening and the filtration unit, for use with the blind support, to at least somewhat reduce odor, light, and noise leakage into the hunting area.

Figure 9:
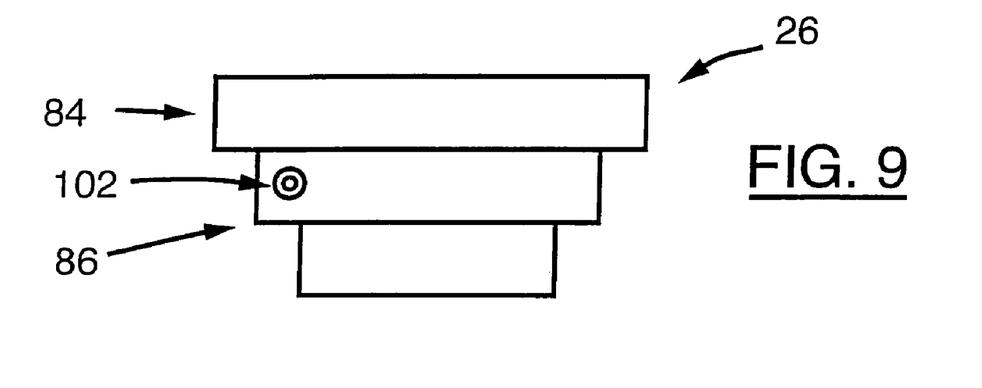
FIG. 9 is a side view of the filtration unit of FIG. 1, showing a scent elimination component and a fan.
Figure 10:
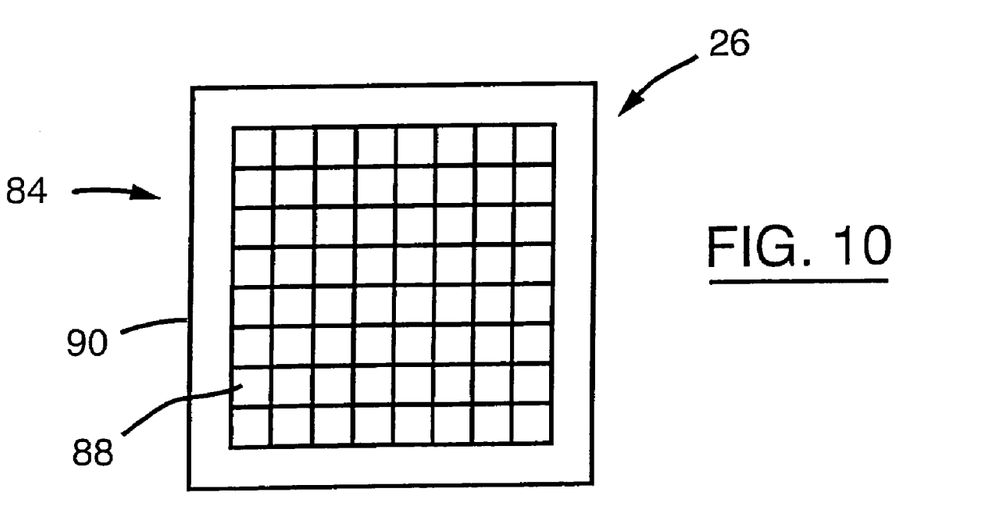
FIG. 10 is a top view of the filtration unit of FIG. 9.
Figure 11:
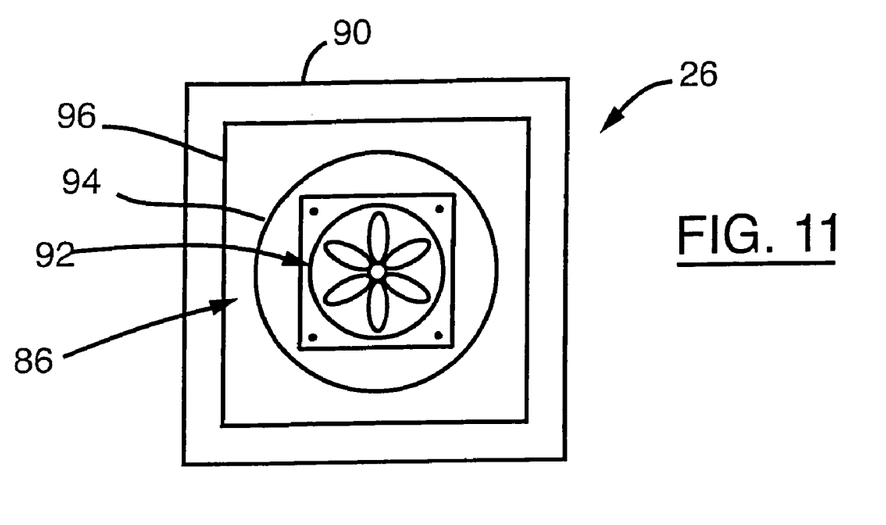
FIG. 11 is a bottom view of the filtration unit of FIG. 9.

Referring now to FIGS. 9–11, the filtration unit 26 includes a scent-elimination element 84 and an air moving device 86. The scent-elimination element 84 is selected for eliminating the odors from humans and hunting gear. For example, the scent-elimination element 84 may include an activated carbon honeycomb material 88 in an aluminum frame 90. The air moving device 86 is operable to move air across the scent-elimination element 84. For example, the air moving device 86 may be provided by an electric fan 92 mounted in a frame 94 and including a power source and controls mounted in a frame 96. A suitable fan assembly is the Model MB6010L12B by Mechatronics, Inc. of Preston, Wash.

In a typical commercial embodiment, the frame components of the filtration unit 26 are attached together or integrally formed as a canister, with the scent-elimination element frame 90 being about 6¼ inch square, the fan control frame 96 being about 5½ inches square, and the fan frame 94 being about 4⅞ inches diameter. And the opening 70 in the blind 22 for the filtration unit 26 is about 4⅞ inches diameter. In this way, when the filtration unit 26 is positioned for use, the fan frame 94 extends though the opening 70 and the fan control frame 96 overhangs and is supported by the bottom panel 58, with the fan frame and the scent-elimination element 84 inside the hunting space formed by the blind 22. The filtration unit 26 may simply rest in place under its on weight on the bottom panel 58, it may be threaded for mating with threads of a collar mounted in the blind 22, or it may be otherwise encouraged to stay in place. In any case, the filtration unit 26 is removably attachable to the blind 22 so that it can be quickly and easily installed for use and later removed when not in use. Thus, the filtration unit 26 may be connected and removed for each hunt. In addition, the activated carbon honeycomb material 88 may be a ½ inch thick piece that is removably received in the frame 90, so that the activated carbon honeycomb material can be replaced periodically.

Figure 12:
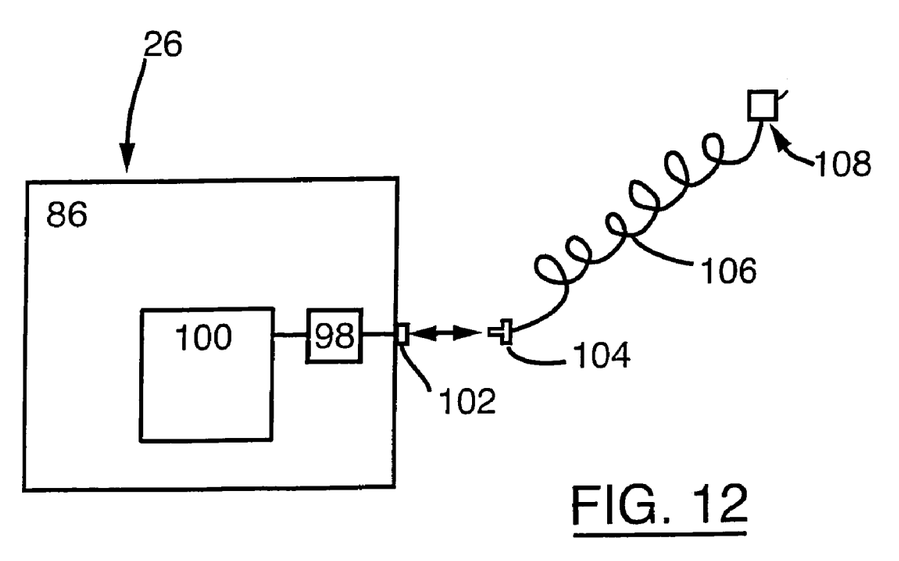
FIG. 12 is a block diagram of the filtration unit of FIG. 9, showing the major electrical components.

Referring to FIG. 12, the major electronic components of the filtration unit 26 are shown in block form. The air mover 86 includes a fan drive 100 such as an electric motor that is electrically connected to a power source 98 such as a 9 volt battery, which is electrically connected to a connector 102. The connector 102 mates with and electrically connects to a connector 104, which is electrically connected by a wire 106 to a fan control 108. In a typical commercial embodiment, the wire 106 is about 4 feet long, and the fan control 108 includes a remote on/off switch and a detachable coupling (e.g., hook-and-loop fasteners) for mounting to the support 24 or the tree stand 12 in a location that provides convenient access by the hunter when seated on the tree stand. In this way, the fan 92 can be selectively operated by the hunter without moving. Although the fan 92 is silent-running so that it does not make enough noise to be heard by wild game (unless they are immediately adjacent the filtration unit 26), the hunter can cut off the fan 92 if he desires when the game approaches the tree stand.

It will be understood that the above-described filtration unit 26 is an exemplary embodiment and that the invention includes other embodiments as well. For example, in one alternative embodiment, the scent-elimination element 84 includes an ultraviolet lamp for providing ozonation and/or another scent-absorbing, neutralizing, or oxidizing agent, in addition to or instead of the activated carbon material. In another alternative embodiment, the filtration unit sits on the bottom panel of the blind or is suspended from the frame, and it includes an outlet hose that is coupled between the filtration unit and the blind opening, for using the system on the ground instead of up in a tree. In yet another alternative embodiment, the fan has sound-muting components such as baffles, dampers, or other conventional sound-muting components. In still another alternative embodiment, the blind has a pocket for storing and transporting the filtration unit when not in use. And in another alternative embodiment, the air mover assembly is an integral unit and the scent-elimination element is a separate unit, and the two are connected together by hosing.

Figure 13:
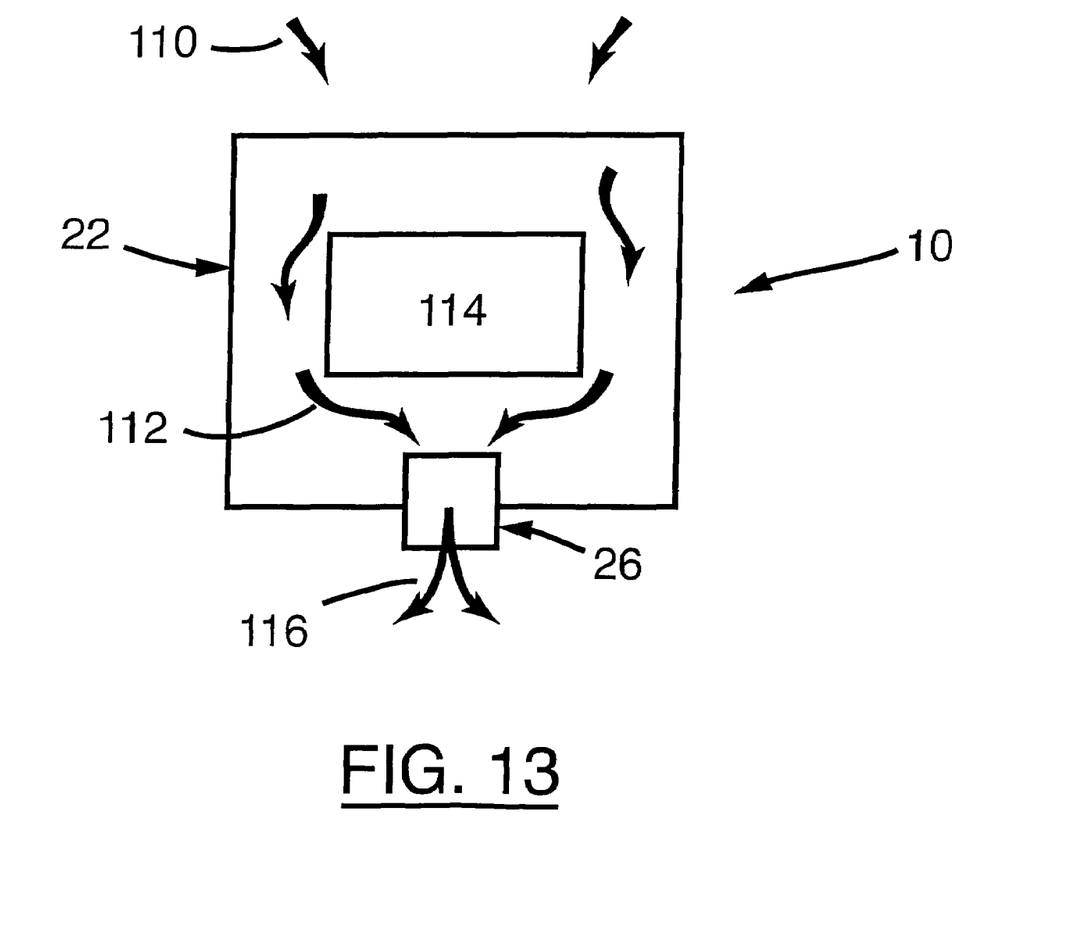
FIG. 13 is a block diagram of schematically showing a scent elimination system and a method of eliminating scents from hunting areas according to the present invention.

FIG. 13 depicts in block form the operation of the scent-elimination system 10 and a method of eliminating scents from a hunting area according to the present invention. While the hunter 114 sits in the blind 22 waiting for prey, odors from his body and equipment tend to settle and pool in the bottom of the blind. The filtration unit 26 is configured to draw clean ambient air 110 into the blind 22 through the open top 60 of the blind 22, across the hunter and his gear 114 to absorb human and other unnatural odors into the air, and to then draw the scent-carrying air 112 into the filtration unit for scent elimination. Then the filtration unit 26 forces the now cleaned air 116 out the bottom of the blind 22 and into the hunting area, thereby reducing the ability of the wild game to use its sense of smell to detect the hunter in the hunting area. In addition, this generates a positive flow of clean air through the blind, to help keep the blind well ventilated and cool.

In order to set up the system 10 for use with a tree stand 12 in a tree 14, the hunter mounts the bracket 27 to the tree 14 by the strap 36 in a position above the tree stand. The passageway 72 of the blind 22 can be left routed onto the support frame 28 between uses, the hunter can do so on the ground before climbing up to the tree stand, or the hunter can mount the blind onto the support frame while up on the tree stand. In any case, the hunter then positions the blind 22 around the tree stand 12 and mounts the support frame 42 to the bracket 27. Next, the hunter positions the tree-wrapping blind portions 80 and 82 in place to form a good seal, and wraps the straps 64 and 66 around the tree and conveniently couples them together inside the blind to maintain the good seal of the blind 22 to the tree 14. If the tree stand has a ladder 20, the snaps 78 and/or other detachable couplings on the blind panels 52, 54, 56, and 58 are connected together to form a good seal around the ladder. And then the hunter places the filtration unit 26 through the opening 70, turns it on, and waits for the big trophy animals to come into the hunting area and unknowingly approach the hunter. After bagging his limit, the hunter then removes the filtration unit 26 from the opening 70 and leaves the rest of the system in place. Or he can leave the filtration unit in place, but should place a lid over it to prevent water from entering the carbon filter element. The next time he goes hunting he only has to reinsert the filtration unit 26 back into the opening 70 and he is ready to hunt. Or the hunter can disassemble the entire system 10 each time he hunts, which is practical because of the quick-connect design of the various components.

On the other hand, to set up the system 10 for use on the ground, the hunter mounts the bracket 27 to the tree 14 or another vertical structure, mounts the support frame 42 to the bracket, and mounts the blind 22 to the tree or other vertical structure. The bottom panel 58 of the blind can be left in or taken out, as desired. Then the hunter positions the filtration unit 26 on its side and places it under one of the side or front panels 52, 54, or 56 with the panel draped over it. If the bottom panel 58 is left in, the filtration unit 26 is placed through an opening between two of the snaps 78 or other detachable couplings holding the bottom panel to the side and end panels 52, 54, and 56. In any case, the hunter then turns the filtration unit 26 on, with similar results as in the tree stand use.

Accordingly, the present invention removes human odors from the air in the vicinity of a hunter so that wild game cannot as easily detect the hunter by using their sense of smell. In addition, the invention removes human and non-human odors from hunting equipment and other items the hunter introduces to the hunting area. Furthermore, the invention is lightweight and quickly and easily assembled and disassembled so that it is portable for hunting.

It is to be understood that this invention is not limited to the specific devices, methods, conditions, and/or parameters described and/or shown herein, and that the terminology used herein is for the purpose of describing particular embodiments by way of example only. Thus, the terminology is intended to be broadly construed and is not intended to be limiting of the claimed invention. In addition, as used in the specification including the appended claims, the singular forms "a," "an," and "the" include the plural, plural forms include the singular, and reference to a particular numerical value includes at least that particular value, unless the context clearly dictates otherwise. Furthermore, any methods described herein are not intended to be limited to the sequence of steps described but can be carried out in other sequences, unless expressly stated otherwise herein.

Moreover, while certain embodiments are described above with particularity, these should not be construed as limitations on the scope of the invention. It should be understood, therefore, that the foregoing relates only to exemplary embodiments of the present invention, and that numerous changes may be made therein without departing from the spirit and scope of the invention as defined by the following claims.

What is claimed is:

1. A scent-elimination system for a hunter, comprising:
   a hunting blind in which the hunter may be concealed, the hunting blind having an air outlet opening and having a left side panel, a right side panel, and a bottom panel therebetween, wherein the side and bottom panels are adapted to secure tightly against a tree with a good seal so that airflow between the blind and the tree is minimized and scent-laden air pools at the bottom panel; and
   a filtration unit adapted to draw the pooled scent-laden air through the filtration unit to absorb odors thereinto, and to vent the filtered air out to the environment.

2. The system of claim 1, wherein the air outlet opening receives therein at least a portion of the filtration unit.

3. The system of claim 1, wherein the air outlet opening is defined at a lower portion of the blind, wherein the filtration unit vents the filtered air from within the blind through the lower air outlet opening.

4. The system of claim 1, wherein the filtration unit comprises a scent-elimination element.

5. The system of claim 1, wherein the filtration unit comprises an air mover.

6. The system of claim 1, further comprising a blind support adapted for mounting to a tree.

7. The system of claim 6, wherein the blind support includes a tree-mounting bracket and a frame that mounts to the bracket.

8. The system of claim 7, wherein the blind support frame includes an end member and two side members pivotally coupled to the end member.

9. The system of claim 7, wherein the tree-mounting bracket includes two connector members and the support frame includes two connector members that mount to the bracket connector members.

10. The system of claim 9, wherein the bracket connector members are outwardly angled and the support frame connector members are inwardly angled for alignment with the outwardly angled bracket connector members.

11. The system of claim 1, wherein the hunting blind is made of a scent-absorbing material.

12. The system of claim 1, wherein the hunting blind further comprises a front end panel between the left and right side panels and opposite the tree, wherein the top of the hunting blind is open.

13. The system of claim 1, wherein the hunting blind comprises a plurality of panels that are sectionalized and detachably coupled together so that the hunter may selectively detach at least two of the panels to permit the hunter to enter and exit the blind, and to permit coupling the panels together around ladders of tree stands for forming a good seal wherein airflow between the blind and the ladder is minimized.

14. The system of claim 1, wherein the left and right side panels having tree-wrapping portions that extend beyond the bottom panel, wherein the left and right side panel tree-wrapping portions may be wrapped at least partially around a tree to form the good seal.

15. The system of claim 14, wherein the left and right side panel tree-wrapping portions include at least one pair of straps sufficiently long that they may be wrapped around the tree in a crossed fashion and bound together inside the blind to secure the tree-wrapping portions tightly against the tree with the good seal.

16. The system of claim 1, wherein the bottom panel has an elastic edge for stretching into a conforming engagement with the tree to form the good seal.

17. The system of claim 1, further comprising a remote on/off control switch electrically connectable to the filtration unit for operating the filtration unit.

18. A scent-elimination system for a hunter, comprising:
    a hunting blind in which the hunter may be concealed; and
    a filtration unit adapted to draw ambient air into the blind, across the hunter to absorb human odors into the air, and through the filtration unit to absorb the human odors thereinto, and to direct the filtered air out to the environment,
    wherein the blind comprises a bottom panel and an air outlet opening defined in the bottom panel, and the filtration unit is adapted for venting the filtered air through the bottom air outlet opening.

19. A hunting blind for use in a scent-elimination system for a hunter, comprising:
a left side panel, a right side panel, and a bottom panel therebetween, the bottom, left, and right side panels adapted to secure tightly against a tree with a good seal so that airflow between the blind and the tree is minimized and scent-laden air pools at the bottom panel.

20. The blind of claim 19, wherein the bottom panel has an elastic edge for stretching into a conforming engagement with the tree to form the good seal.

21. The blind of claim 20, wherein the left and right side panels have tree-wrapping portions that extend beyond the bottom panel, wherein the left and right side panel tree-wrapping portions may be wrapped at least partially around the tree to form the good seal.

22. The blind of claim 19, wherein the hunting blind comprises a plurality of panels that are sectionalized and detachably coupled together so that the hunter may selectively detach at least two of the panels to permit the hunter to enter and exit the blind, and to permit coupling the panels together around ladders of tree stands for forming a good seal.

23. The blind of claim 19, wherein the blind has an air outlet opening formed therein through which the filtration unit vents filtered air from within the blind through.

24. The blind of claim 23, wherein the air outlet opening is defined at a lower portion of the blind.

25. The blind of claim 19, wherein the left and right side panels have tree-wrapping portions that extend beyond the bottom panel, wherein the left and right side panel tree-wrapping portions may be wrapped at least partially around the tree to form the good seal.

26. The blind of claim 25, wherein the left and right side panel tree-wrapping portions include at least one pair of straps sufficiently long that they may be wrapped around the tree in a crossed fashion and bound together inside the blind to secure the tree-wrapping portions tightly against the tree with the good seal.

27. A method of eliminating a hunter's scent from a hunting area, comprising:
providing a blind defining a closed space except for at least one air inlet opening and an air outlet opening;
providing a filtration unit for scent elimination;
drawing ambient air into the blind through the air inlet and around the hunter to absorb human odors into the air;
drawing the scent-laden air into the filtration unit for scent elimination; and
directing the cleaned air through the air outlet opening, out of the blind, and into the hunting area.

28. The method of claim 27, further comprising the step of mounting the blind to a tree with a good seal.

29. The method of claim 28, wherein the step of mounting the blind to a tree with a good seal comprises wrapping two extended side panel portions at least partially around the tree.

30. The method of claim 29, wherein the step of mounting the blind to a tree with a good seal further comprises stretching an elastic edge of a bottom panel of the blind into a conforming engagement with the tree.

31. The method of claim 29, wherein the step of mounting the blind to a tree with a good seal further comprises wrapping at least one pair of straps, which are attached to the two extended side panel portions, around the tree in a crossed fashion and binding them together inside the blind to secure the two extended side panel portions tightly against the tree.

32. The method of claim 27, wherein the air inlet opening is defined in an upper portion of the blind and the air outlet is defined in a lower portion of the blind, wherein the step of drawing ambient air comprises drawing ambient air into the blind through the upper air inlet and downwardly around the hunter to absorb human odors into the air.

* * * * *